(12) United States Patent  
Xie et al.

(10) Patent No.: US 9,017,814 B2  
(45) Date of Patent: Apr. 28, 2015

(54) SUBSTANTIALLY CYLINDRICAL COMPOSITE ARTICLES AND FAN CASINGS

(75) Inventors: Ming Xie, Beavercreek, OH (US); Michael Scott Braley, Cincinnati, OH (US); Curt Brian Curtis, Nesbit, MS (US); Warren Rosal Ronk, West Chester, OH (US)

(73) Assignee: General Electric Company, Schenectady, NY (US)

( * ) Notice: Subject to any disclaimer, the term of this patent is extended or adjusted under 35 U.S.C. 154(b) by 852 days.

(21) Appl. No.: 11/872,854

(22) Filed: Oct. 16, 2007

(65) Prior Publication Data

US 2009/0098337 A1   Apr. 16, 2009

(51) Int. Cl.

| | |
|---|---|
| *B32B 3/00* | (2006.01) |
| *B32B 5/02* | (2006.01) |
| *B29C 70/32* | (2006.01) |
| *B29C 70/22* | (2006.01) |
| *F01D 21/04* | (2006.01) |
| *B29C 70/20* | (2006.01) |
| *B29L 31/00* | (2006.01) |
| *B29C 57/00* | (2006.01) |

(52) U.S. Cl.
CPC ............ *B29C 70/32* (2013.01); *F05D 2300/21* (2013.01); *F05D 2300/614* (2013.01); *F05D 2300/603* (2013.01); *F05D 2300/6012* (2013.01); *F05D 2300/224* (2013.01); *B29L 2031/7504* (2013.01); *B29C 57/00* (2013.01); *B29C 70/222* (2013.01); *F05D 2250/231* (2013.01); *Y02T 50/672* (2013.01); *F05D 2300/433* (2013.01); *F05D 2300/2102* (2013.01); *F01D 21/045* (2013.01); *B29C 70/202* (2013.01)

(58) Field of Classification Search
USPC ............ 248/205.1; 428/116, 72, 73; 156/254, 156/174, 285  
See application file for complete search history.

(56) References Cited

U.S. PATENT DOCUMENTS

| | | | |
|---|---|---|---|
| 4,214,932 A | | 7/1980 | Van Auken |
| 4,248,649 A | | 2/1981 | Harrison et al. |
| 4,368,234 A | | 1/1983 | Palmer et al. |
| 4,385,952 A | | 5/1983 | Futakuchi et al. |
| 4,571,355 A | | 2/1986 | Elrod |
| 4,699,567 A | * | 10/1987 | Stewart .................. 415/200 |
| 4,902,201 A | | 2/1990 | Neubert |
| 4,980,006 A | | 12/1990 | Bordner |
| 5,055,242 A | | 10/1991 | Vane |

(Continued)

FOREIGN PATENT DOCUMENTS

| | | |
|---|---|---|
| DE | 10005202 A1 | 11/2000 |
| EP | 1938955 A1 | 7/2008 |

(Continued)

OTHER PUBLICATIONS

Office Action from corresponding JP Application No. 2008-264724, dated May 28, 2013.

(Continued)

*Primary Examiner* — Ellen S Raudenbush  
(74) *Attorney, Agent, or Firm* — General Electric Company; Pamela A. Kachur

(57) ABSTRACT

Articles having substantially cylindrical bodies including a plurality of circumferential layers, each layer having at least one ply of material, the material comprising a weave fabric, a non-crimp fabric, or a combination thereof.

11 Claims, 9 Drawing Sheets

(56) References Cited

U.S. PATENT DOCUMENTS

| | | | |
|---|---|---|---|
| 5,431,532 A | 7/1995 | Humke et al. | |
| 5,809,805 A * | 9/1998 | Palmer et al. | 66/84 A |
| 5,952,067 A | 9/1999 | Head | |
| 6,112,634 A | 9/2000 | Head | |
| 6,148,865 A | 11/2000 | Head | |
| 6,182,398 B1 | 2/2001 | Head | |
| 6,250,193 B1 | 6/2001 | Head | |
| 6,395,210 B1 | 5/2002 | Head et al. | |
| 6,510,961 B1 | 1/2003 | Head et al. | |
| 7,246,990 B2 | 7/2007 | Xie et al. | |
| 7,390,161 B2 | 6/2008 | Xie et al. | |
| 8,771,445 B2 | 7/2014 | Joern et al. | |
| 2003/0190452 A1* | 10/2003 | Lucas et al. | 428/116 |
| 2004/0041128 A1 | 3/2004 | Carter et al. | |
| 2005/0226714 A1 | 10/2005 | Worthoff et al. | |
| 2006/0130993 A1 | 6/2006 | Blanton et al. | |
| 2006/0134251 A1 | 6/2006 | Blanton et al. | |
| 2008/0116334 A1* | 5/2008 | Xie et al. | 248/205.1 |

FOREIGN PATENT DOCUMENTS

| | | |
|---|---|---|
| JP | 63-178128 U1 | 11/1988 |
| JP | 03-161326 A | 7/1991 |
| JP | 2002-227067 A | 8/2002 |
| JP | 2002-283466 A | 10/2002 |
| JP | 2003-170513 A | 6/2003 |
| JP | 2004-160927 A | 6/2004 |
| JP | 2005-299654 A | 10/2005 |
| JP | 2006-177364 A | 7/2006 |
| WO | 0216481 A1 | 2/2002 |
| WO | 2006121505 A1 | 11/2006 |
| WO | 2007010052 A1 | 1/2007 |
| WO | 2008130739 A1 | 10/2008 |

OTHER PUBLICATIONS

Search Report and Written Opinion issued in connection with corresponding GB Application No. GB0817874.1 dated Jan. 21, 2009.

Non-Final Rejection towards corresponding U.S. Appl. No. 11/872,844 dated Sep. 13, 2010.

Office Action issued in connection with corresponding GB Application No. GB0817874.1 on Jan. 9, 2012.

Office Action issued in connection with corresponding CA Application No. 2,604,279 on Nov. 15, 2013.

\* cited by examiner

SUBSTANTIALLY CYLINDRICAL COMPOSITE ARTICLES AND FAN CASINGS

TECHNICAL FIELD

Embodiments described herein generally relate to composite articles having a substantially cylindrical body. More particularly, embodiments herein generally describe composite fan casings having a substantially cylindrical body including a plurality of circumferential layers.

BACKGROUND OF THE INVENTION

In gas turbine engines, such as aircraft engines, air is drawn into the front of the engine, compressed by a shaft-mounted compressor, and mixed with fuel in a combustor. The mixture is then burned and the hot exhaust gases are passed through a turbine mounted on the same shaft. The flow of combustion gas expands through the turbine, which in turn spins the shaft and provides power to the compressor. The hot exhaust gases are further expanded through nozzles at the back of the engine, generating powerful thrust, which drives the aircraft forward.

Because engines operate in a variety of conditions, foreign objects may sometimes undesirably enter the engine. More specifically, foreign objects, such as large birds, hailstones, sand and rain may be entrained in the inlet of the engine. As a result, these foreign objects may impact a fan blade and cause a portion of the impacted blade to be torn loose from the rotor, which is commonly known as fan blade out. The loose fan blade may then impact the interior of the fan casing causing a portion of the casing to bulge or deflect. This deformation of the casing may result in increased stresses along the entire circumference of the fan casing.

In recent years composite materials have become increasingly popular for use in a variety of aerospace applications because of their durability and relative light weight. Current composite technology typically uses material having a tri-axial braid. As the name suggests, tri-axial braid generally consists of three fiber tows interwoven to form a braided ply of material. Although braided composite materials can provide superior weight and impact resistance properties when compared to non-composite materials, improvements can still be made.

For example, tri-axial braid material can often support only a defined maximum amount of applied tension beyond which the fiber architecture of the material will undesirably distort. Moreover, layered plies of tri-axial braid material can exhibit a degree of interlocking, which can make delamination difficult to ensure during impacts. This can result in a limited degree of impact energy dissipation. Additionally, the complexity of the braid design can make such materials costly.

Accordingly, there remains a need for articles, and in particular composite fan casings, made from more cost effective materials that can provide the desired delamination while supporting increased tension.

BRIEF DESCRIPTION OF THE INVENTION

Embodiments herein generally relate to articles comprising a substantially cylindrical body including a plurality of circumferential layers, each layer having at least four plies of a material, a first ply and a fourth ply comprising a weave fabric including 0°/90° fiber tows and a second ply and a third ply comprising a non-crimp fabric including θ and −θ fiber tows wherein θ is from about 10° to about 80°.

Embodiments herein also generally relate to articles comprising a substantially cylindrical body including a plurality of circumferential layers, each layer having at least four plies of a material, a first ply and a fourth ply comprising a weave fabric including 0°/90° fiber tows and a second ply and a third ply comprising a weave fabric including 45°, and −45° fiber tows.

Embodiments herein also generally relate to fan casings comprising a substantially cylindrical body including a plurality of circumferential layers, each layer having at least one ply of material, the material comprising a non-crimp fabric.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Embodiments described herein generally relate to articles, and in particular composite fan containment casings (herein "fan casings"), having a substantially cylindrical body including a plurality of circumferential layers, each layer having at least one ply of material, the material comprising a weave fabric, a non-crimp fabric, or a combination thereof.

While embodiments herein may generally focus on composite fan casings for gas turbine engines, it will be understood by those skilled in the art that the description should not be limited to such. Indeed, as the following description explains, the following description is equally applicable to any composite article having a substantially cylindrical body.

Figure 1:
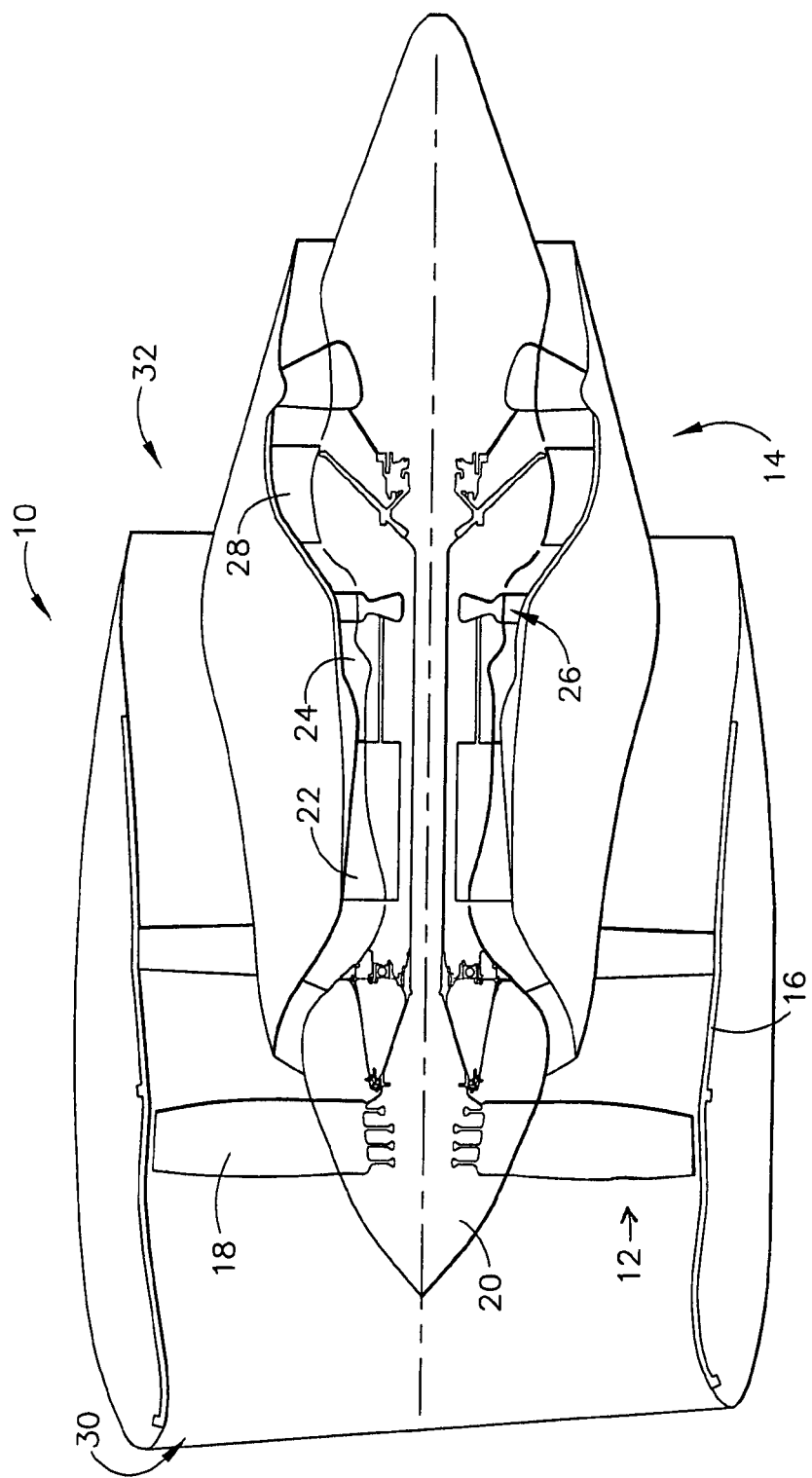
FIG. 1 is a schematic cut away view of one embodiment of a gas turbine engine in accordance with the description herein.

Turning to the figures, FIG. 1 is a schematic representation of one embodiment of a gas turbine engine 10 that generally includes a fan assembly 12 and a core engine 14. Fan assembly 12 may include a fan casing 16 and an array of fan blades 18 extending radially outwardly from a rotor disc 20. Core engine 14 may include a high-pressure compressor 22, a combustor 24, a high-pressure turbine 26 and a low-pressure turbine 28. Engine 10 has an intake end 30 and an exhaust end 32.

To make the articles described herein, at least one ply of material can be wrapped about a substantially cylindrically shaped tool to produce a plurality of circumferential layers, which may then be treated with a resin and cured, as set forth herein below.

Figure 2:
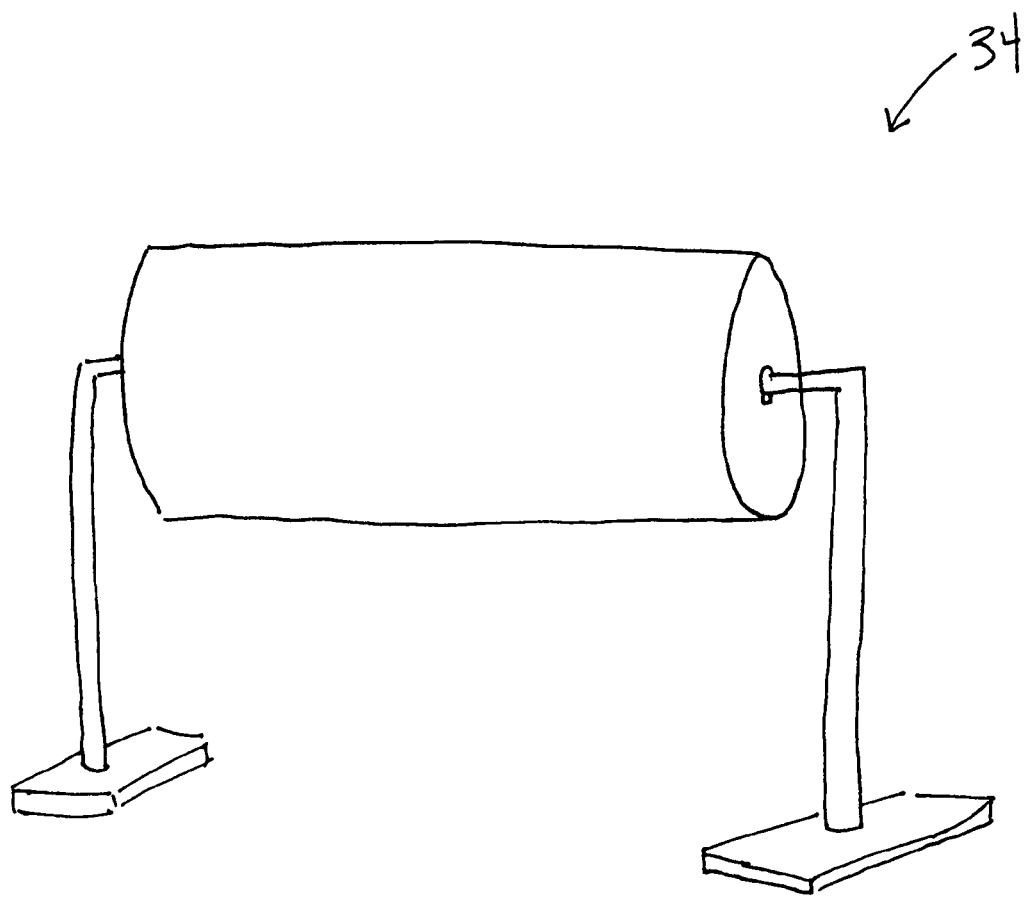
FIG. 2 is a schematic view of one embodiment of a tool having a substantially cylindrical shape in accordance with the description herein.

Initially, as shown in FIG. 2, a tool 34 having a substantially cylindrical shape can be provided. See, for example, U.S. Patent Application No. 2006/0134251 to Blanton et al. As used herein throughout, the term "substantially cylindrical" means generally having the shape of a cylinder, either with or without a contour, as explained herein below. Tool 34 may be internally solid, hollow, or some combination thereof.

At least one ply of a material may then be provided for wrapping about tool 34, as described herein below. The ply of material may comprise a weave fabric, a non-crimp fabric, or a combination thereof. As used herein "weave fabric" refers to fabric that is formed on a loom, or other like device, by interlacing two sets of fiber tows together. Weave fabric can comprise a variety of patterns, including, but not limited to, plain weave, twill weave, and four-harness weave. "Non-crimp fabric" refers to fabric that is formed by stacking one or more plies of unidirectional fibers and then stitching the layers together. The unidirectional fibers of non-crimp fabric may be oriented in a variety of ways to satisfy design requirements.

Figure 3:
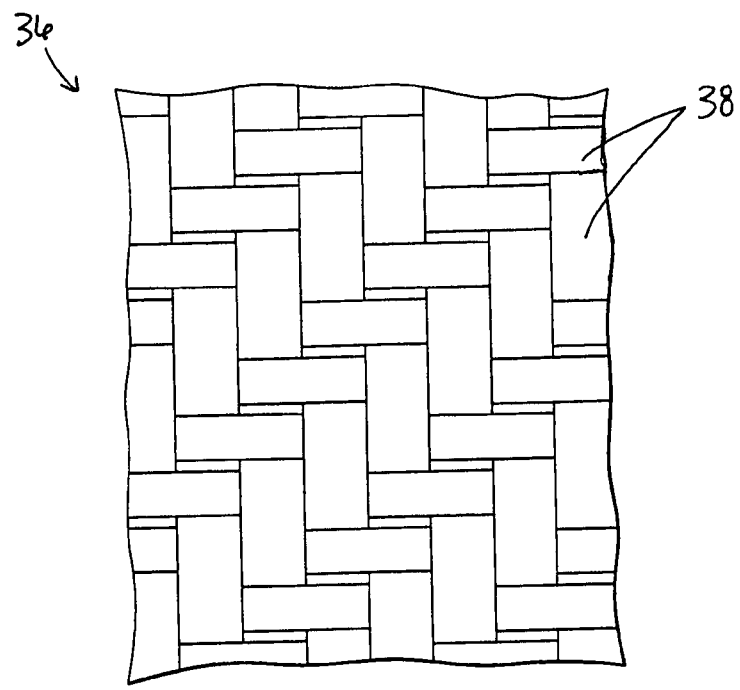
FIG. 3 is a schematic close-up view of one embodiment of a material comprising a weave fabric including 0°/90° fiber tows in accordance with the description herein.
Figure 4:
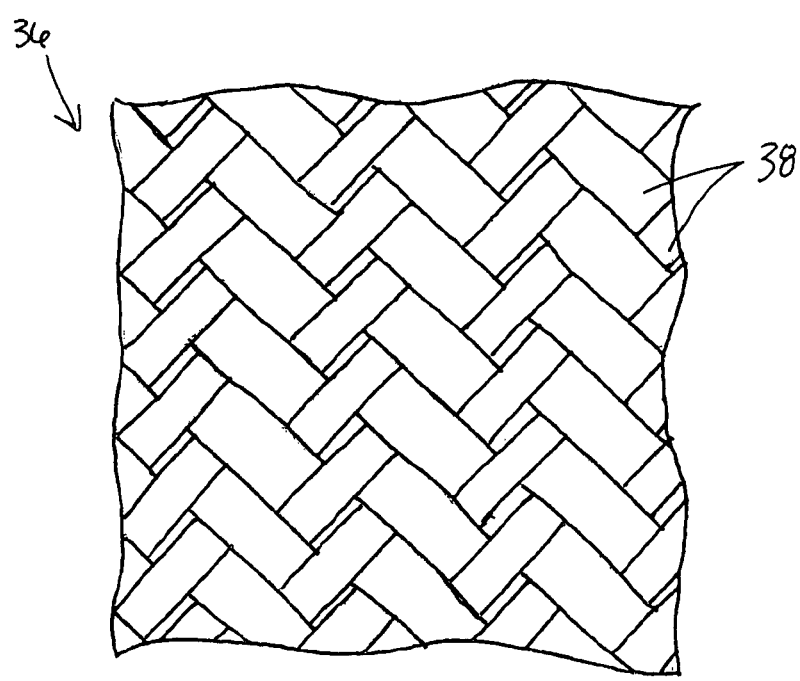
FIG. 4 is a schematic close-up view of one embodiment of a material comprising a weave fabric including 45°, −45° fiber tows in accordance with the description herein.
Figure 5:
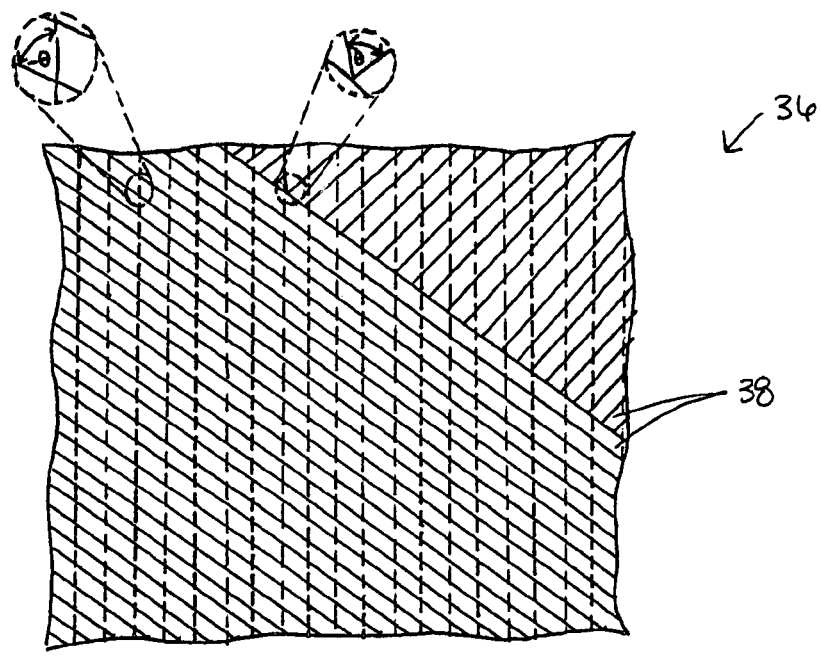
FIG. 5 is a schematic cut away view of one embodiment of a material comprising a non-crimp fabric including θ and −θ fiber tows wherein θ is 45° in accordance with the description herein.
Figure 6:
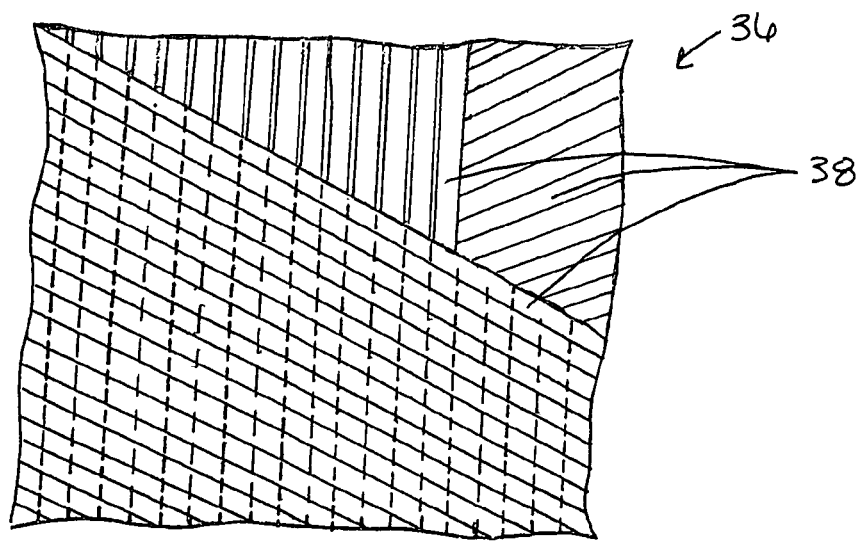
FIG. 6 is a schematic cut away view of one embodiment of a material comprising a non-crimp fabric including 0°, 60°, −60° fiber tows in accordance with the description herein.
Figure 7:
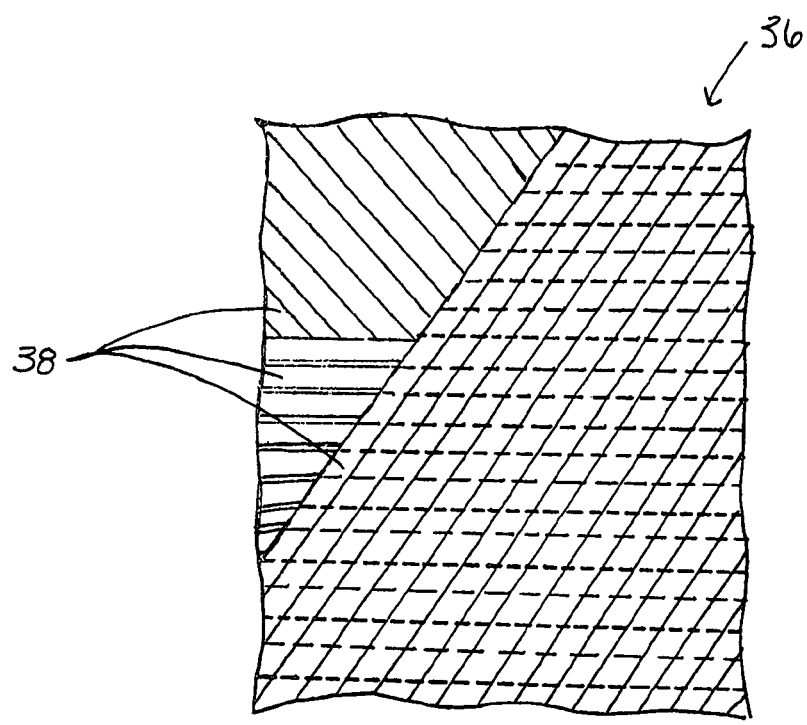
FIG. 7 is a schematic cut away view of one embodiment of a material comprising a non-crimp fabric including 90°, 30°, −30° fiber tows in accordance with the description herein.

For example, ply of material 36 may comprise a weave fabric including 0°/90° fiber tows 38 (as shown in FIG. 3) or 45° and −45° fiber tows 38 (as shown in FIG. 4). Similarly, ply of material 36 may comprise a non-crimp fabric including θ and −θ fiber tows 38 wherein θ is from about 10° to about 80°, and in one embodiment may be 45° (as shown in FIG. 5), 0°, 60° and −60° fiber tows 38 (as shown in FIG. 6) or 90°, 30°, −30° fiber tows 38 (as shown in FIG. 7). Those skilled in the art will understand that because the non-crimp fabric is formed by stitching together stacks of unidirectional fibers, the unidirectional fibers may have virtually any angle of orientation desired and should not be limited to the examples provided previously herein.

Regardless of the fabric utilized, or the orientation of the fiber tows of the fabric, in general, the fiber tows may comprise any suitable reinforcing fiber known to those skilled in the art capable of being combined with a resin to produce a composite material. In one embodiment, the fiber tows may comprise at least one of carbon fibers, graphite fibers, glass fibers, ceramic fibers, and aromatic polyamide fibers. Additionally, each fiber tow 38 may comprise from about 3000 to about 24,000 individual fiber filaments.

Figure 8:
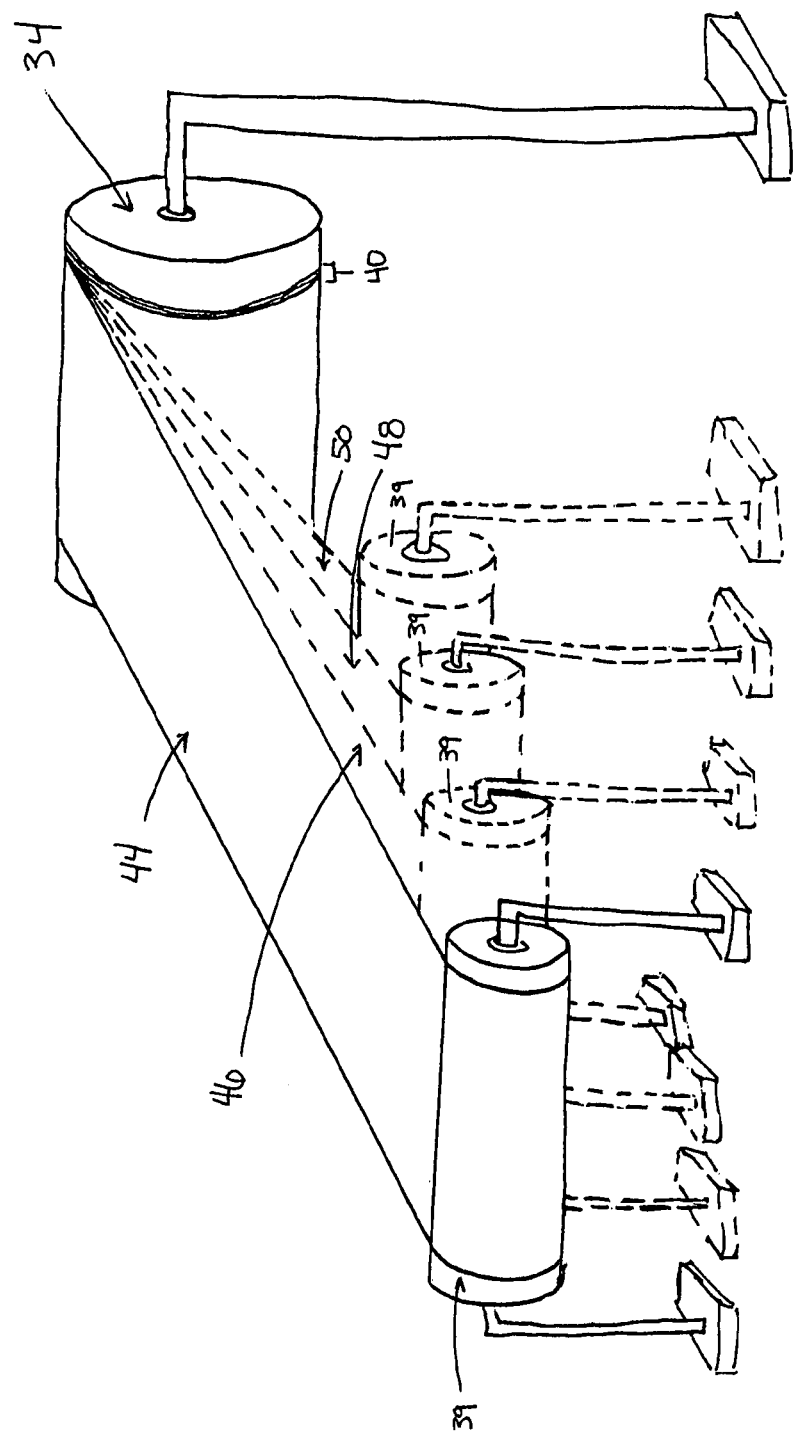
FIG. 8 is a schematic perspective view of one embodiment of a tool having at least one ply of material, and optionally four plies, wrapped concurrently thereabout in accordance with the description herein.

Next, as shown in FIG. 8, at least one ply of material 36, a first ply 44, may be wrapped about tool 34 from a spool 39 to produce an article preform having a plurality of circumferential layers 40. In one embodiment, the article preform may comprise a fan casing preform 42 (shown in FIG. 9). For embodiments in which more than one ply of material 36 is employed, first ply 44, second ply 46, third ply 48 and fourth ply 50 may be wrapped concurrently about tool 34 from respective spools 39 to form plurality of circumferential layers 40 of the fan casing preform, as shown in FIG. 8.

To address the previously discussed deficiencies with current composite technology, in one embodiment, it may be desirable to wrap at least one ply of material 36 about tool 24, wherein ply of material 36 comprises a non-crimp fabric. In this instance, the non-crimp fabric may comprise 0°, 60° and −60° fiber tows (as shown in FIG. 6) or alternately, 90°, 30° and −30° fiber tows (as shown in FIG. 7). In an alternate embodiment, it may be desirable to wrap at least four plies of material 36 about tool 34, wherein the plies of material comprise either weave fabric or a combination of weave fabric and non-crimp fabric. More particularly, one embodiment may involve providing at least four plies of a material, the first ply 44 and fourth ply 50 comprising a weave fabric including 0°/90° fiber tows and the second ply 46 and third ply 48 comprising a weave fabric including 45° and −45° fiber tows. An alternate embodiment may involve providing at least four plies of material, the first ply 44 and fourth ply 50 comprising a weave fabric including 0°/90° fiber tows and the second ply 46 and third ply 48 comprising a non-crimp fabric including θ and −θ fiber tows wherein θ is from about 10° to about 80°, and in one embodiment, θ is 45°.

Figure 9:
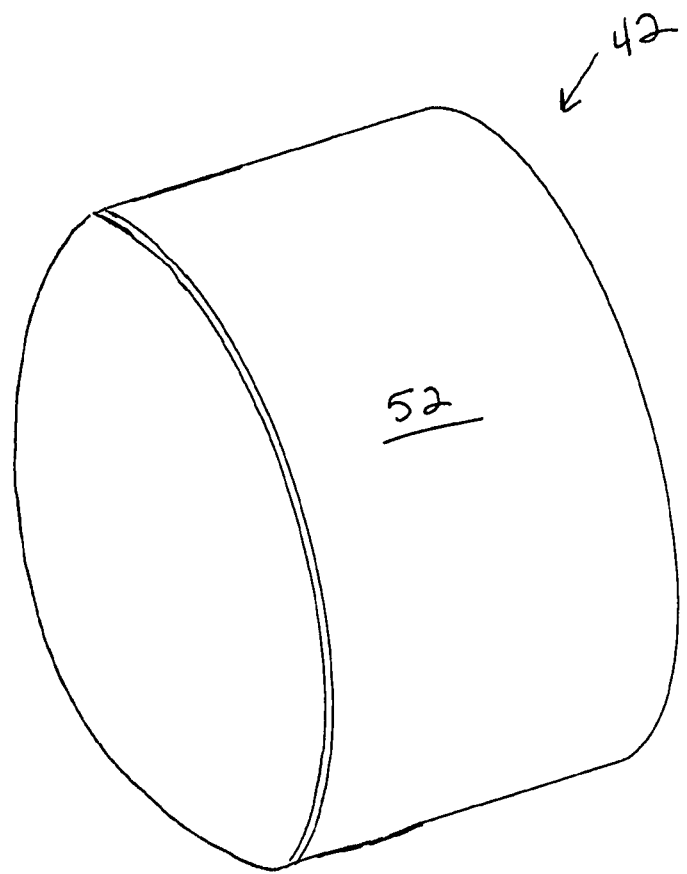
FIG. 9 is a schematic perspective view of one embodiment of a fan casing preform in accordance with the description herein.

After all desired plies of material 36 have been wrapped about tool 34, the resulting fan casing preform 42 can have a substantially cylindrical body 52, as shown in FIG. 9.

Figure 10:
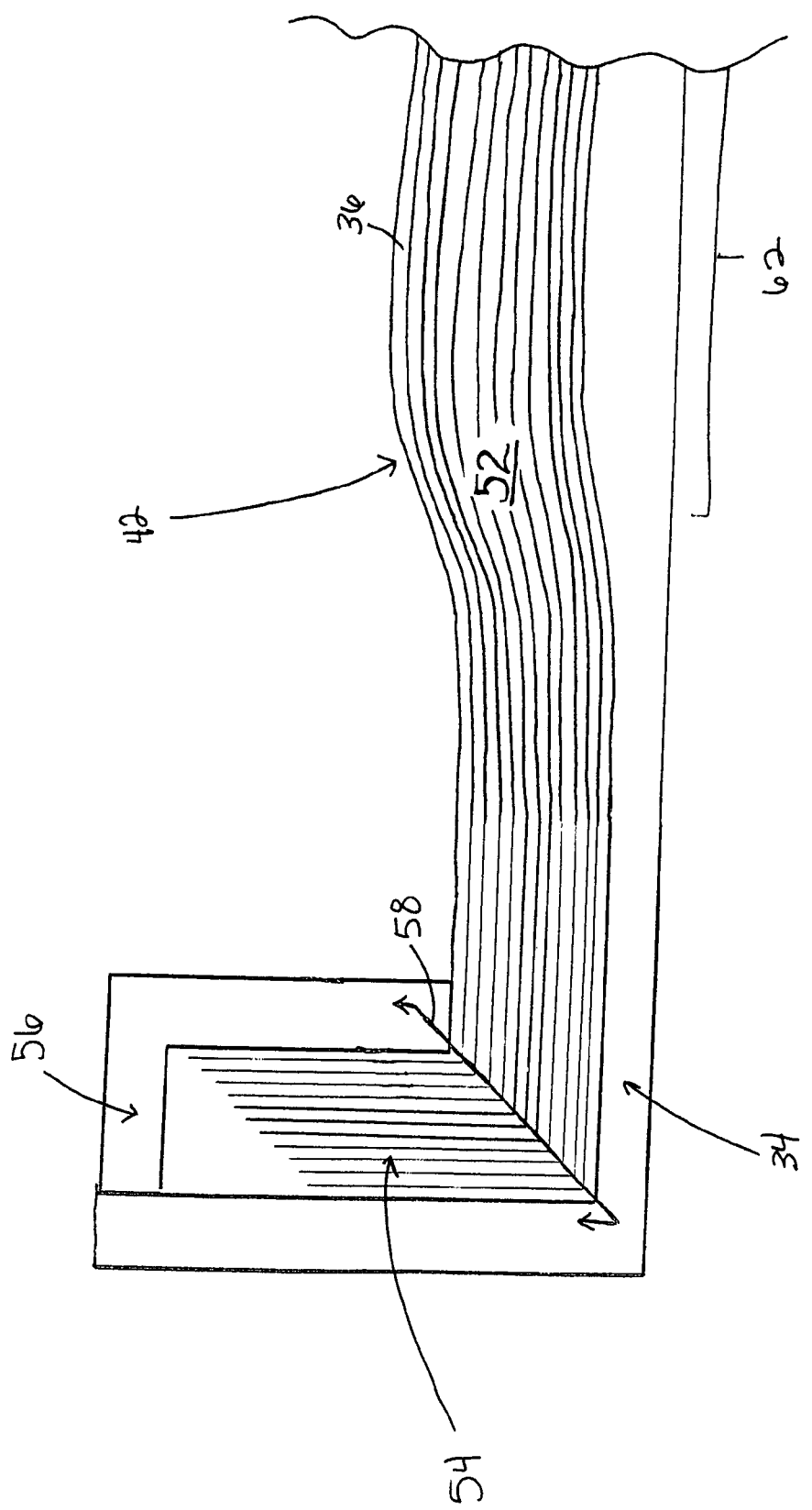
FIG. 10 is a schematic partial, cross-sectional view of one embodiment of a tool with an end flange shoe having a fan casing preform with an end flange and a contour wrapped thereabout.

Optionally, in one embodiment, fan casing preform 42 may be constructed to comprise at least a first end flange 54 that is integral with substantially cylindrical body 52. First end flange 54 may be constructed using tool 34 having at least a first end flange shoe 56 as shown in FIG. 10. Before wrapping the desired ply or plies of material 36 about tool 34 having first end flange shoe 56, any 0° fiber tows present can be removed from a first end portion 58 of the ply of material 36 having the 0° fiber tows. Alternately, the weave fabric or non-crimp fabric may be constructed so as to lack 0° fiber tows in the area that is first end portion 58. By "end portion" it is meant a section running lengthwise along an edge of ply of material 36 that generally corresponds in width to the desired length of the end flange 54 it will be used to construct, as shown in FIG. 10.

For example, in plies of material 36 comprising either a weave fabric including 0°/90° fiber tows, or a non-crimp fabric including 0°, 60°, −60° fiber tows, the 0° fiber tows can be removed from first end portion 58, and the first end portions aligned with the first end flange shoe 56 of tool 34. The 0° fiber tows may be removed using any technique known to those skilled in the art, such as, but not limited to, cutting and pulling the 0° fiber tows from the ply of material at the first end portion 58. Plies of material 36 lacking 0° fiber tows may also be aligned with end flange shoe to aid in the construction of end flange 54, and all plies may then be wrapped concurrently about tool 34 until the desired thickness is obtained. Those skilled in the art will understand that a second end flange 60 may be integrally constructed at the opposing end of body 52 of fan casing preform 42 using the methods described previously.

Figure 11:
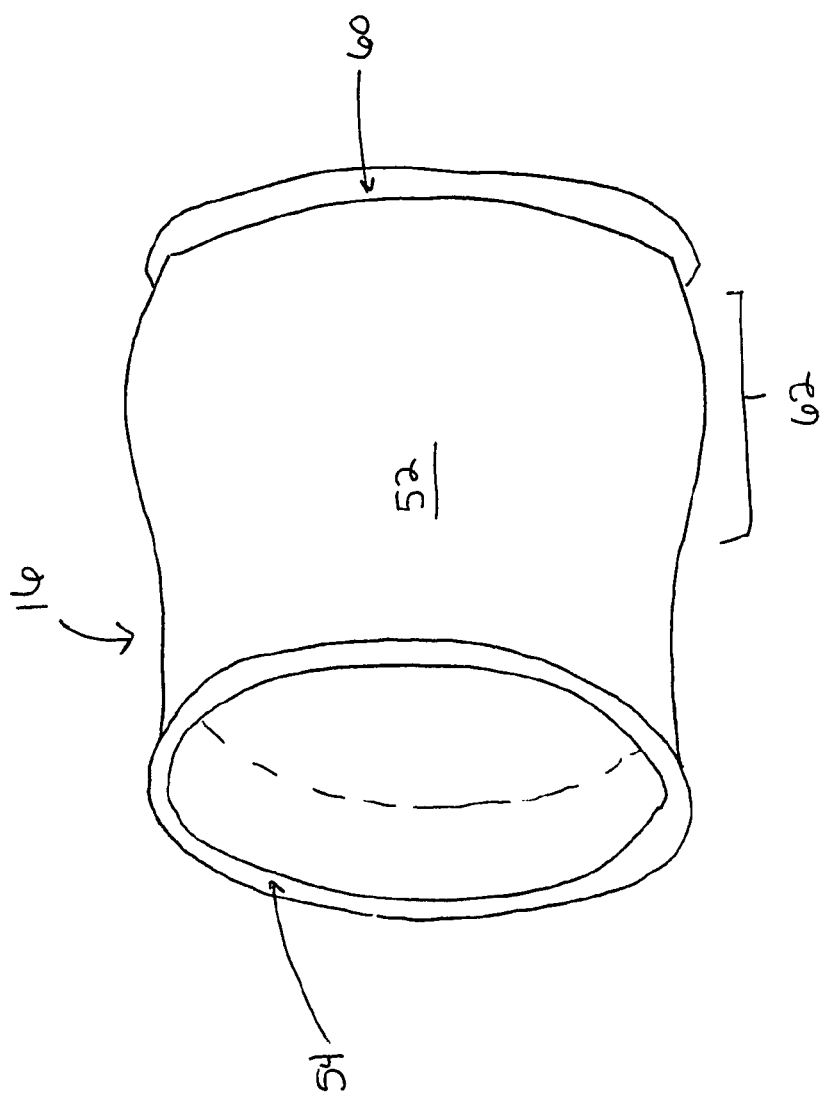
FIG. 11 is a schematic perspective view of one embodiment of a fan casing having a contour and a first and second end flange in accordance with the description herein.

In another embodiment, fan casing preform 42 may comprise a contour 62, as shown in FIGS. 10 and 11. As used herein, "contour" means that at least a portion of body 52 of the fan casing (preform) comprises a curve that may be directed inward to, outward from, or some combination thereof, the plane of body 52. Despite the presence of contour 62, body 52 can remain substantially cylindrical. To fabricate a body 52 having 62 contour, the tool utilized can comprise the desired contour 62 such that as the circumferential layers are layed-up about the tool, the contour is formed.

Once all desired plies of material 38 have been wrapped about tool 34 to produce fan casing preform 42, a resin may be applied to the preform to bond the circumferential layer together when cured. Any resin commonly used by those skilled in the art is acceptable for use herein. Conventional resins commonly used in composite technology can include, but should not be limited to, vinyl ester resins, polyester resins, acrylic resins, epoxy resins, polyurethane resins, and mixtures thereof. Application of the resin may be carried out using any suitable technique known to those skilled in the art, such as resin film infusion (RFI), resin transfer molding (RTM), vacuum assisted resin transfer molding (VARTM), and other like techniques.

Having applies the selected resin, the preform may then be cured using conventional curing techniques known to those skilled in the art to produce an article, which in one embodiment is a fan casing 16 having substantially cylindrical body 52, a first end flange 54 and a second end flange 60, as shown in FIG. 11.

Constructing an article, and in particular a fan casing, using the previously described materials and methods can offer several benefits over current composite technology. For example, because weave fabric and non-crimp fabric display less fiber undulation than tri-axial braid, the surface of such fabrics is smoother and less prone to mechanical interlocking of successive plies. Less interlocking equates to enhanced delamination, which can provide for increased energy dissipation after an impact. Another benefit is that weave and non-crimp fabrics can be more stable than tri-axial braid and therefore, can support increased tension without suffering significant distortion to their fiber architecture. This ability to support tension allows for tighter wraps about the tool and a reduced occurrence of wrinkle formation, which can interfere with the functioning of the article. Additionally, the lack of 0° fiber tows in the end portion of the plies of material can allow for the construction of integral end flanges in articles comprising weave fabrics and non-crimp fabrics. Having the end flanges integral to the fan casing allows for stronger flanges that can withstand greater applied forces when compared to non-integral flanges. Moreover, due to the manner of construction, weave fabric and non-crimp fabrics can be a more cost effective alternative to tri-axial braid fabric.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fan casing comprising:
an article preform having
as substantially cylindrical body and optionally a first end flange,
wherein the body includes plurality of circumferential layers, each layer having at least four plies of a material, a first ply and a fourth ply comprising a weave fabric including 0°/90° fiber tows and a second ply and a third ply comprising a non-crimp fabric including θ and −θ fiber tows, wherein θ is from about 10° to about 80°,
the end portion of each ply forming the length of the optional end flange, the 0° fiber tows being removed from the weave fabric of material of forming the end portion; and
a resin, each of the plurality of layers treated with the resin,
wherein the resin-treated layers are cured to form the preform.

2. The fan casing of claim 1 wherein the fiber tows of each ply comprise at least one of carbon fibers, graphite fibers, glass fibers, ceramic fibers, and aromatic polyamide fibers.

3. The fan casing of claim 1 wherein θ is 45°.

4. The fan casing of claim 1 wherein at least a portion of the casing comprises a contour.

5. The fan casing of claim 1 further comprising at least a first end flange made by a method including:
removing the 0° fiber tows from a first end portion of the first ply of material and a first end portion of the fourth ply of material;
wrapping the at least four plies of material concurrently, about a tool having at least first end flange shoe such that at least the first end portion if the first ply of material and the first end portion of the fourth ply of material are aligned with the first end flange shoe to produce an article preform comprising at least as first end flange preform portion;
applying a resin to the article preform; and
curing the article preform to produce the fan casing comprising the first end flange.

6. The fan casing of claim 1 wherein θ is 60°.

7. The fun casing of claim 1 wherein θ is 30°.

8. The fan casing of claim 5 wherein applying resin to the article preform includes a method selected from the group consisting of resin film infusion, resin transfer molding and vacuum assisted resin transfer molding.

9. The fan casing of claim 5 wherein removing fiber tows from the first end flange provides a fan casing with increased energy dissipation and reduced wrinkle formation.

10. The fan casing of claim 1 wherein the casing further includes a second flange.

11. An article comprising:
an article preform having
a substantially cylindrical body and optionally a first end flange,
wherein the body includes a plurality of circumferential layers, each layer having at least one ply selected from the group consisting of a non-crimp fabric, a crimp fabric and combinations thereof;
the end portion of each ply forming the length of the optional end flange, the 0° fiber tows being removed from the weave fabric of material forming the end portion;
a resin, each of the plurality of layers treated with the resin,
wherein the resin-treated layers are cured to form the preform,
wherein the non-crimp fabric is formed by stacking one or more plies of unidirectional fiber and stitching the layers together, and
the weave fabric includes two sets of fiber tows interlaced together.

* * * * *

UNITED STATES PATENT AND TRADEMARK OFFICE
CERTIFICATE OF CORRECTION

| | | |
|---|---|---|
| PATENT NO. | : 9,017,814 B2 | Page 1 of 1 |
| APPLICATION NO. | : 11/872854 | |
| DATED | : April 28, 2015 | |
| INVENTOR(S) | : Xie et al. | |

It is certified that error appears in the above-identified patent and that said Letters Patent is hereby corrected as shown below:

On the Title Page, in Column 2, under "Primary Examiner", Line 1, delete "Ellen S Raudenbush" and insert -- Ellen S Wood --, therefor.

In the Specification:

In Column 4, Line 10, delete "tool 24," and insert -- tool 34, --, therefor.

In Column 5, Line 6, delete "plies of material 38" and insert -- plies of material 36 --, therefor.

In Column 5, Line 19, delete "Having applies" and insert -- Having applied --, therefor.

In the Claims:

In Column 5, Line 61, in Claim 1, delete "as substantially" and insert -- a substantially --, therefor.

In Column 5, Line 63, in Claim 1, delete "plurality" and insert -- a plurality --, therefor.

In Column 6, Line 26, in Claim 5, delete "if the" and insert -- of the --, therefor.

In Column 6, Line 29, in Claim 5, delete "at least as" and insert -- at least a --, therefor.

In Column 6, Line 35, in Claim 7, delete "The fun" and insert -- The fan --, therefor.

Signed and Sealed this
Ninth Day of August, 2016

Michelle K. Lee
*Director of the United States Patent and Trademark Office*